Oct. 4, 1966

L. E. FRANK 3,276,298

HUB LINKAGE AXLE NUT TOOL

Filed April 14, 1964

INVENTOR.
LEONARD E. FRANK

BY

SHANLEY AND O'NEIL
*ATTORNEYS*

Oct. 4, 1966  L. E. FRANK  3,276,298
HUB LINKAGE AXLE NUT TOOL
Filed April 14, 1964  2 Sheets-Sheet 2

INVENTOR.
LEONARD E. FRANK
BY
SHANLEY AND O'NEIL
ATTORNEYS

3,276,298
Patented Oct. 4, 1966

3,276,298
HUB LINKAGE AXLE NUT TOOL
Leonard E. Frank, 1 Frank Drive, Forest Grove,
Coraopolis, Pa.
Filed Apr. 14, 1964, Ser. No. 359,568
5 Claims. (Cl. 81—75)

The invention is concerned with an axle nut tool which links an axle nut to a contiguous wheel hub. A specific application for the invention is removal and/or installation of axle nuts for mounting motor truck wheels on floating axles. The invention will be described in that environment although the hub nut link of the present invention may be used for the removal and installation of adjusting nuts, locking nuts, or any threaded-on retaining device where a rotating hub is retained on an axle in flush or recessed relation to the open end of the hub.

Axle nut tooling available on the market today requires the purchase of a plurality of special fitting wrenches because a different tool is required for differing size axle nut and wheel hub structures. It is a primary objective of the present invention to provide a tool adaptable to any size axle nut wheel hub structure ordinarily encountered, the tool being simple to manufacture and use, small in size and weight, adapted to be readily carried in the pocket of a mechanic, having built-in safety features which protect the structure being worked on, and having replaceable features which make it economic to acquire and operate.

In describing the invention reference will be had to the accompanying drawings wherein.

Like numbers are used to designate like parts where applicable in the above figures.

Figure 1:
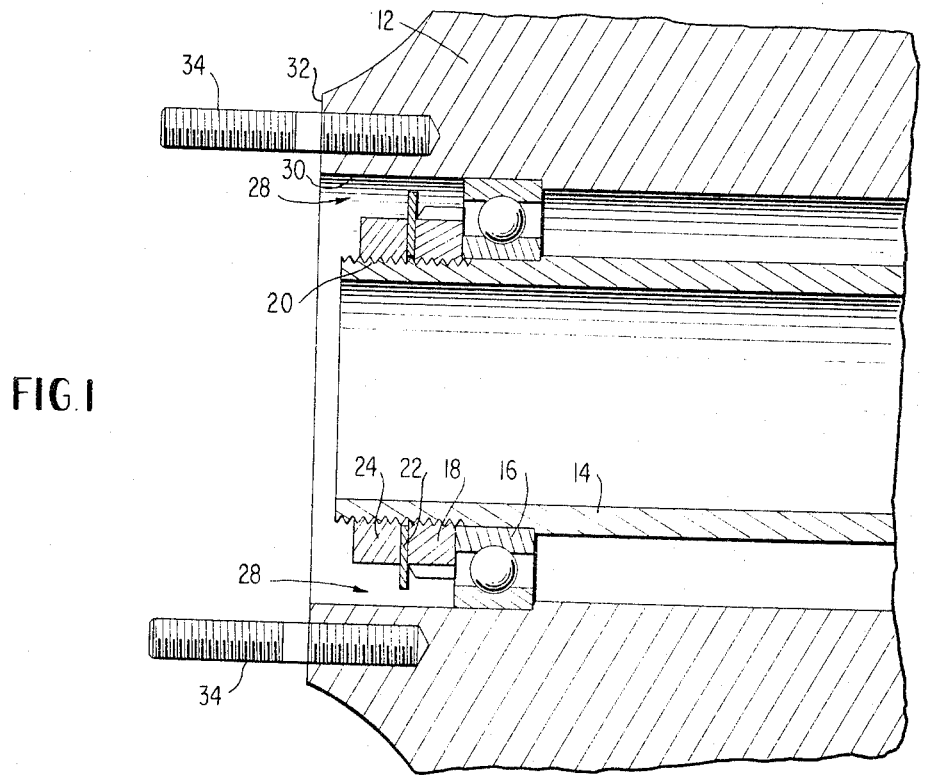
FIGURE 1 is a schematic view, partially in section, of an environment for application of the invention.

A typical environment for application of the invention is shown in FIGURE 1 which is a cross-sectional showing of a portion of wheel hub structure for a floating axle. Wheel hub 12 is mounted on axle 14 via bearing 16. An axle nut 18 on threaded section 20 of axle 14 is used for securing the wheel hub to the axle or adjusting the bearing. Ordinarily, a washer 22 and lock nut 24 are used in addition to nut 18.

Axle nuts 18 and 24 mounted on the threaded portion 20 of axle 14 are recessed within the open face of wheel hub 12 and an open space 28 is defined between the outer periphery of nuts 18 and 24 and the inner circumferential surface 30 of wheel hub 12. Face 32 of wheel hub 12 includes a plurality of studs 34.

The invention makes provision for linking an axle nut to a hub so that rotation of a wheel mounted on an axle will cause the wheel to act as a tool handle for purposes of removing or installing an axle nut.

Figure 2:
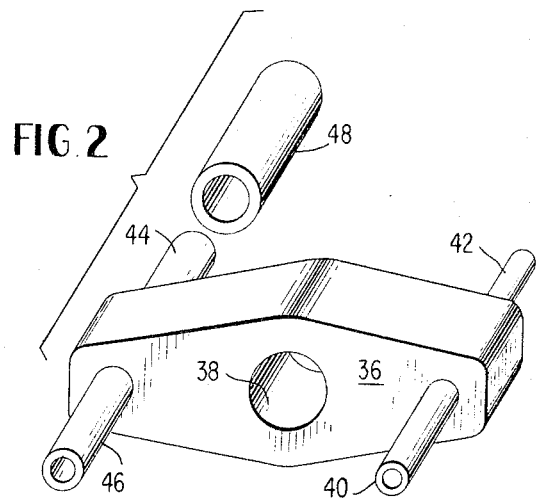
FIGURE 2 is a perspective view of a specific embodiment of the invention.

Referring to FIGURE 2, the hub nut link shown includes a link body 36 defining a stud gripping aperture 38. Pin 40 protudes from link body 36 along an axis substantially parallel to the axis of the stud gripping aperture 38. In practice a plurality of pins differing in both size and length, such as 40, 42, 44, and 46, may be used. An adjustable sleeve such as 48 for the pins or the stud gripping aperture 38 is provided.

Figure 3:
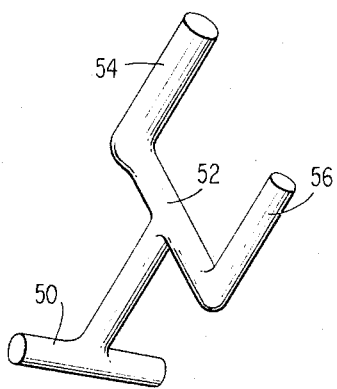
FIGURE 3 is a perspective view of a specific embodiment of the invention.

FIGURE 3 shows a variant form of hub nut link tool. In this variant, the link body includes handle 50 and cross bar 52 supporting pins 54 and 56.

Figure 4:
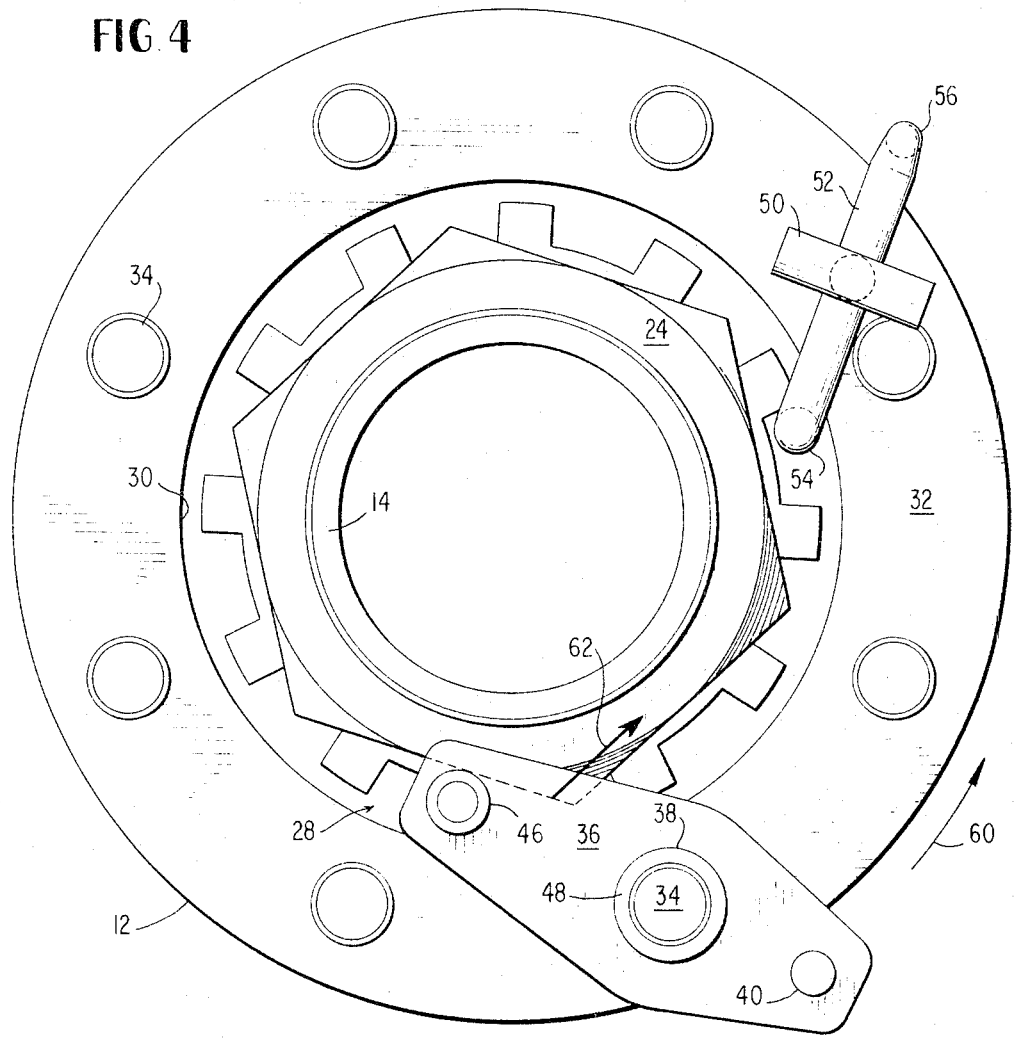
FIGURE 4 is a plan view showing use of the invention.

Operation of the hub nut link tool of FIGURE 2 is shown in FIGURE 4. Link body 36 is secured to wheel hub 12 by attachment to stud 34. Aperture 38 holds sleeve 48 decreasing the diameter of the aperture and link body 36 is attached to the wheel hub via the aperture. A pin means protrudes into space 28 between the outer periphery of nut 24 and the inner circumferential surface 30 of wheel hub 12. When the wheel is rotated in the direction shown by arrow 60, the pin means is caught in the area of diminishing clearance and exerts a tangential force on the nut as shown by arrow 62. It should be noted that the direction of force is optimum for removal of the nut and that little or no force is exerted radially on the nut.

Operation of the variant of FIGURE 3 is shown in FIGURE 4 with pin means 54 in the recess between the outer diameter of nut 24 and the inner surface of wheel hub 12. The cross bar 52 extends across face 32 of the wheel hub and is held to the wheel hub by the pin 56.

Figure 5:
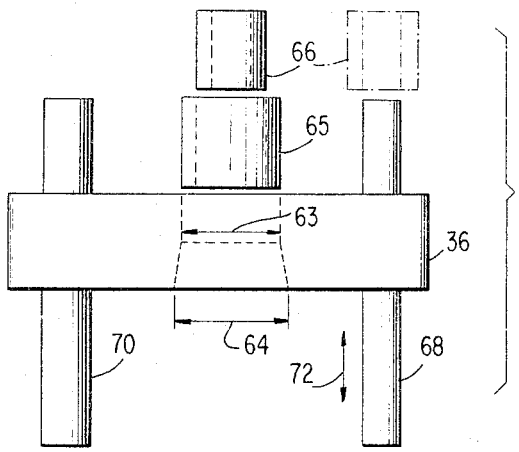
FIGURE 5 is an end view of structure embodying the invention.

Referring to FIGURE 5, some adjustable features will be described in more detail. It will be noted that the stud aperture in link body 36 has a varying diameter along its axial length. Internal diameter 63 is shorter than entrance diameter 64. This facilitates handling of sleeves such as 65 and 66. These sleeves may be used to change the diameter of pin means 68 and 70 mounted on the link body 36 or to change the diameter of the stud aperture 38.

The pin means 68 and 70 of FIGURE 5 are of differing diameters. They are mounted in link body 36 so as to be movable in the direction shown by arrow 72 by use of a hammer or other tool.

The metal for link body 36 may be aluminum alloy or similar alloys of suitable tensile strength and of preselected softness, within the stud aperture, to avoid damage to threaded portions of a stud. Similarly, the metal for the sleeves, such as 64 and 66, and pins, such as 68 and 70, has preselected mechanical properties to avoid damage to an axle nut or the internal surface of a wheel hub. For this reason, pins 68 and 70 are preferably hollow and can be chosen to collapse or "give" at preselected pressures. However, with force being applied tangentially to an axle nut body as in the present invention compressive forces on a pin means are not great and damage to a nut or wheel hub structure has not been experienced.

Modifications and variations of the present invention will be possible in the light of the above teachings. It is therefore to be understood that within the scope of the appended claims, the invention may be practiced otherwise than as specifically described.

What is claimed is:

1. For providing rotary movement of an axle nut at least partially recessed within an axle mounted wheel hub including cover plate retaining studs, the wheel hub being in surrounding relationship to the outer periphery of the axle nut so as to define a recess between the outer periphery of the axle nut and the internal circumferential surface of the wheel hub, an axle nut tool for linking the axle nut to the wheel hub so that rotation of the wheel hub causes rotation of the axle nut comprising link body means defining a stud gripping aperture and carrying a plurality of pins of adjustable lengths for selective placement of one of the pins into the recess between the outer periphery of an axle nut and the internal circumferential surface of a wheel hub when the link body means is secured to the wheel hub by placement of the stud gripping aperture defined by the link body means over a stud on the wheel hub.

2. The structure of claim 1 in which the plurality of pins are of differing diameters.

3. The structure of claim 1 further including a plurality of sleeves for adjusting the size of the stud gripping aperture defined by the link body means.

4. The structure of claim 1 further including a plurality of sleeves for adjusting the internal diameter of the stud gripping aperture defined by the link body means and the external diameters of the plurality of pins carried by the link body means.

5. The structure of claim 1 in which the plurality of pins are hollow tubes of preselected strength to prevent damage to the wheel hub.

References Cited by the Examiner

UNITED STATES PATENTS

| | | | |
|---|---|---|---|
| 757,613 | 4/1904 | Gilliland | 81—75 |
| 761,523 | 5/1904 | Miller. | |
| 1,412,965 | 4/1922 | Pridemore | 81—13 |
| 2,512,978 | 6/1950 | Steinmann | 81—74 |

WILLIAM FELDMAN, *Primary Examiner.*

J. C. PETERS, *Assistant Examiner.*